(12) United States Patent
Chattin

(10) Patent No.: US 6,293,884 B1
(45) Date of Patent: Sep. 25, 2001

(54) CLUSTER SPROCKETS FOR BICYCLE TRANSMISSIONS AND OTHER PRIME MOVERS

(75) Inventor: Jessie R. Chattin, Tampa, FL (US)

(73) Assignee: Chattin Cluster Gears, Inc., Tampa, FL (US)

( * ) Notice: Subject to any disclaimer, the term of this patent is extended or adjusted under 35 U.S.C. 154(b) by 0 days.

(21) Appl. No.: 09/392,214

(22) Filed: Sep. 8, 1999

(51) Int. Cl.[7] .............. F16H 55/12; F16H 55/30
(52) U.S. Cl. .......... 474/160; 474/158; 474/164; 74/437; 74/594.2
(58) Field of Search .................. 474/156, 158, 474/160, 162, 153, 202; 74/437, 594.1, 594.2

(56) References Cited

U.S. PATENT DOCUMENTS

| 557,676 | * | 4/1896 | Heath | 74/435 |
|---|---|---|---|---|
| 1,202,227 | | 10/1916 | Sandifur . | |
| 3,661,021 | | 5/1972 | Ohshita | 74/217 B |
| 3,709,053 | | 1/1973 | Oshita | 74/243 R |
| 4,259,880 | | 4/1981 | Ueno | 75/594.2 |
| 4,348,200 | | 9/1982 | Terada | 474/160 |
| 5,073,151 | | 12/1991 | Nagano | 474/160 |
| 5,085,620 | * | 2/1992 | Nagano | 474/152 |
| 5,085,621 | | 2/1992 | Nagano | 474/160 |
| 5,087,226 | | 2/1992 | Nagano | 474/160 |
| 5,123,878 | | 6/1992 | Nagano | 474/160 |
| 5,133,695 | | 7/1992 | Kobayashi | 474/160 |
| 5,192,248 | | 3/1993 | Nagano | 474/140 |
| 5,192,249 | | 3/1993 | Nagano | 474/160 |
| 5,503,598 | * | 4/1996 | Neuer et al. | 474/78 |
| 5,690,570 | | 11/1997 | Chang | 474/158 |
| 5,716,297 | | 2/1998 | Bodmer | 474/78 |
| 5,738,603 | | 4/1998 | Schmidt et al. | 474/158 |
| 5,876,296 | | 3/1999 | Hsu et al. | 474/160 |
| 6,039,665 | * | 3/2000 | Nakamura | 474/157 |

FOREIGN PATENT DOCUMENTS

| 60-30856 | * | 2/1985 | (JP) | 474/80 |
|---|---|---|---|---|
| 5-254481 | * | 10/1993 | (JP) | 474/80 |

* cited by examiner

*Primary Examiner*—David A. Bucci
*Assistant Examiner*—Vicky A. Johnson
(74) *Attorney, Agent, or Firm*—Holland & Knight, LLP

(57) ABSTRACT

This invention comprises a multi-sprocket or cluster gear assembly with a plurality of progressively sized sprockets or gears that are positioned adjacent to each other so as to define an increasing diameter sprocket assembly. Each sprocket comprises a non-circular configuration having at least one long dedendum radius and at least one short dedendum radius, such as an eccentric oval shape. The short radius and the long radius of two adjacent sprockets are aligned and substantially equal in length with each other. The teeth of the sprockets may comprise a chamfer face to better facilitate derailing from one sprocket to the adjacent sprocket. The axial alignment of one sprocket may be retarded by one tooth, relative to the axial alignment of the larger sprocket to better facilitate derailing.

12 Claims, 1 Drawing Sheet

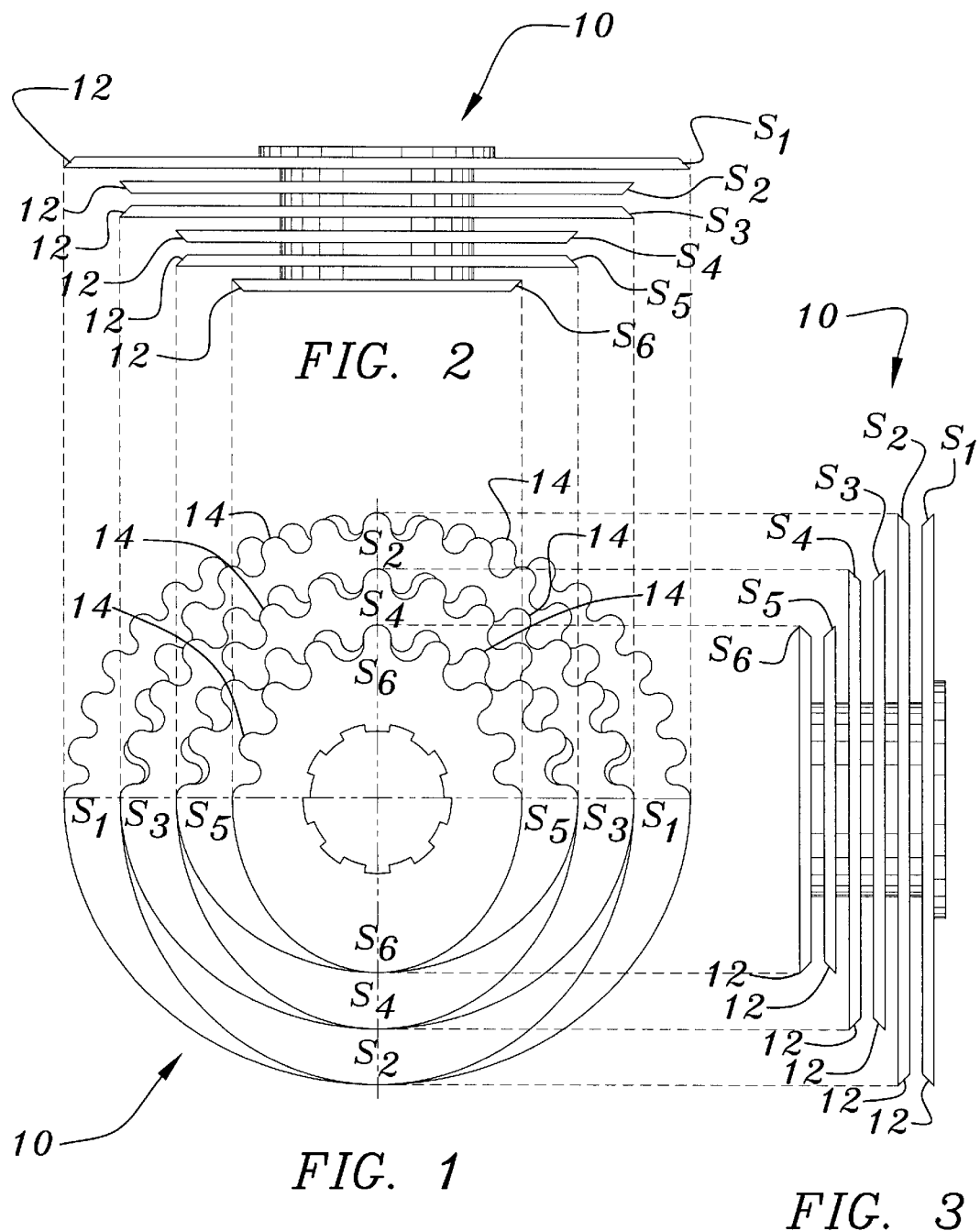

CLUSTER SPROCKETS FOR BICYCLE TRANSMISSIONS AND OTHER PRIME MOVERS

BACKGROUND OF THE INVENTION

1. Field of the Invention

This invention relates to automatic transmissions for bicycles and other prime movers. More particularly, this invention relates to a multi-speed transmission employing a cluster sprocket assembly, wherein switching of the chain from one sprocket to an adjacent sprocket is controlled by a derailer assembly. Still more particularly, the invention relates to cluster sprocket assemblies having teeth configurations and placements which facilitate movement of the chain from one sprocket to an adjacent sprocket during derailing.

2. Description of the Background Art

Presently, there exist many types of transmissions that employ a cluster sprocket assembly and a derailer assembly for selectively moving a chain from one sprocket to another adjacent sprocket so as to change the speed of the bicycle. Basically, derailers function to exert a force on the chain in a location proximate to the cluster sprocket assembly so as to force the chain into alignment with the adjacent sprocket. During derailing from one sprocket to another sprocket, the chain is forcibly urged off of the teeth of the one sprocket and onto the teeth of the adjacent sprocket. Upon a full revolution, the chain is thus fully derailed from the one sprocket and is fully engaged around the adjacent sprocket, thereby completing the derailing to the adjacent sprocket.

Cluster sprocket assemblies and derailers have been universally accepted throughout the bicycle industry. However, it has also been widely known that the chain may slip during derailing should the teeth of the adjacent sprocket not fully engage the chain as the chain is forcibly moved off the one sprocket onto the adjacent sprocket. Slippage during shifting is highly undesirable as it causes the bicyclist to lose cadence. Moreover, chain slippage during a power stroke may cause the bicyclist to lose control of the bicycle and may even result in an accident.

Heretofore, there have been many attempts to improve upon the derailing of the chain from one sprocket to an adjacent sprocket. Representative patents describing various improvements are disclosed in the following U.S. patents, the disclosures of which are hereby incorporated by reference herein:

| U.S. PAT. NO. | TITLE |
| --- | --- |
| 1,202,227 | Change Speed Mechanism |
| 3,661,021 | Multiple Free Wheel for a Bicycle |
| 3,709,053 | Multi-Speed Transmission Front Gear Mechanism for a Bicycle |
| 4,259,880 | Multi-Stage Gear Crank for a Bicycle |
| 4,348,200 | Multi-Speed Sprocket Assembly for a Bicycle |
| 5,073,151 | Multi-Speed Sprocket Assembly for Bicycle |
| 5,085,621 | Multi-Stage Sprocket Assembly for Bicycle |
| 5,087,226 | Multi-Stage Sprocket Assembly for Bicycle |
| 5,123,878 | Multistage Sprocket Assembly |
| 5,133,695 | Bicycle Multiple Chainwheel |
| 5,192,248 | Multi-Stage Sprocket Assembly for Bicycle |
| 5,192,249 | Multi-Stage Sprocket Assembly for Bicycle |
| 5,503,598 | Derailleur Arrangement, in Particular for Bicycles |
| 5,690,570 | Multi-Stage Sprocket Assembly for A Bicycle |
| 5,716,297 | Derailleur Arrangement for Bicycles |
| 5,738,603 | Derailleur |
| 5,876,296 | Gear Shifting Sprocket Set for Bicycle Chain Wheel |

Many of the prior art patents referenced above disclose various types of gear-tooth configurations and placements to facilitate derailing of the chain from one sprocket to an adjacent sprocket. As can be seen in such patents, tooth configuration has heretofore been optimized to allow the chain to twist axially sideways so as to more easily be derailed from one sprocket to an adjacent sprocket. The positions of the teeth on the sprockets are likewise optimized to facilitate derailing. For example, a "missing" tooth configuration has been known to facilitate derailing as the "missing" tooth space more easily allows the chain to be grasped by the tooth of an adjacent sprocket without slippage. U.S. Pat. No. 4,438,200 listed above further provides a "missing" tooth configuration wherein a reduced dedendum radius or recess is provided at the point of the "missing" tooth. A tooth is positioned in the reduced dedendum radius or recess to facilitate shifting of the gear of the chain from one sprocket to an adjacent sprocket by means of the tooth positioned in such recess.

While the foregoing cluster sprocket assemblies noted above have been recognized in the industry as providing some solutions to the problem of slippage during derailing, there is nevertheless a substantial need in the derailer industry for cluster sprockets having configurations that optimize the derailing of the chain from one sprocket to an adjacent sprocket.

Therefore, it is an object of this invention to provide an improvement which overcomes the aforementioned inadequacies of the prior art devices and provides an improvement which is a significant contribution to the advancement to cluster sprocket assemblies for transmissions that facilitate derailing of a chain from one sprocket to an adjacent sprocket without slippage.

Another object of this invention is to provide a cluster sprocket assembly for bicycles and other prime movers wherein the individual sprockets are non-circular in configuration and aligned with adjacent sprockets such that at least one dedendum radius of one sprocket is substantially equal in length and aligned with at least one dedendum radius of an adjacent sprocket, whereby there exists a point in which the dedendum radii of the adjacent sprockets are substantially equal.

Another object of this invention is to provide a cluster sprocket assembly for a primer mover, comprising a plurality of progressively-sized sprockets axially and concentrically positioned relative to one another, the axial positioning of one the sprockets being retarded relative to the axial positioning of an adjacent larger sprocket, the sprockets comprising a non-circular configuration having at least one long dedendum diameter and at least one short dedendum diameter, the short dedendum diameter (e.g., an eccentric oval), of the sprockets being slightly appreciably shorter in length than the long dedendum radius of respective adjacent sprockets, an apex of at least some teeth of the sprockets including a chamfer face, the apex of at least one of the sprockets further including a slanted apex.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a multi-sprocket or cluster gear assembly including a plurality of progressively-sized sprockets or gears that are positioned adjacent to one another so as to define an increasing-diameter sprocket assembly. For use in connection with a bicycle or other prime mover, a derailer or other mechanism is provided to forcibly derail the chain riding on one sprocket to an adjacent sprocket. Upon derailing of the chain from the one sprocket, the chain is engaged by a tooth of an adjacent sprocket and then pulled through a rotational movement such that the chain is fully derailed from the one sprocket to an adjacent sprocket upon one complete revolution.

According to the invention, each sprocket of the cluster sprocket assembly comprises a non-circular configuration having at least one long dedendum radius and at least one short dedendum radius (e.g., eccentric oval). In the preferred embodiment of an oval configuration, there exist two long dedendum radiuses forming a long dedendum diameter and two short dedendum radiuses forming a short dedendum diameter. The sprockets according to the invention are substantially axially aligned adjacent to one another such that the short dedendum radius of one sprocket is axially substantially aligned with and substantially equal in length with the long dedendum radius of an adjacent sprocket. In the preferred embodiment of sprockets comprising an oval configuration, the short dedendum diameter of an adjacent sprocket is axially substantially aligned with and substantially equal in length with the long dedendum diameter of an adjacent sprocket.

The alignment of the short dedendum radius of one sprocket with the long dedendum radius of an adjacent sprocket facilitates derailing of the chain from the one sprocket to the adjacent sprocket at the point where the respective short and long dedendum radiuses are substantially aligned and substantially equal in length with each other. The derailing is accomplished by virtue of the fact that the chain need not move radially outwardly or inwardly from the sprocket on which it is engaged to an adjacent sprocket as occurs in prior art sprocket assemblies wherein the sprockets are generally circular in configuration and comprise different dedendum diameters. As there is no need to move the chain radially outwardly or inwardly, during derailing, the chain is allowed to be easily moved to the adjacent sprocket at the point wherein the respective long and short dedendum diameters of adjacent sprockets are substantially equal.

It is noted, however, that the preferred embodiment of the invention is configured with the long dedendum radius of one sprocket slightly appreciably shorter in length than the adjacent short dedendum radius of the adjacent sprocket so as to better facilitate derailing from the one sprocket to the adjacent sprocket. It is also noted that the teeth of the sprockets may comprise a chamfer face to better facilitate derailing from the one sprocket to the adjacent sprocket. Finally, it is noted that the axial alignment of the one sprocket may be retarded, preferably by approximately one tooth, relative to the axial alignment of the adjacent larger sprocket to better facilitate derailing from the one sprocket to the adjacent larger sprocket.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a side plan view of the cluster sprocket assembly of the invention;

FIG. 2 is a top plan view thereof; and

FIG. 3 is a front plan view thereof.

Similar reference characters refer to similar parts throughout the several views of the drawings.

DETAILED DESCRIPTION OF THE PREFERRED EMBODIMENT

As best shown in FIGS. 1–3, the cluster sprocket assembly 10 of the invention comprises a plurality of sprockets $S_{1-6}$, that are axially positioned on a wheel axis X so as to respectively adjacently positioned. It shall be understood that the sprocket assembly 10 of the invention may comprise a greater or lesser number of sprockets depending upon the desired transmission configuration (e.g., 18-speed or 21-speed) for the bicycle or other prime mover in which the sprocket assembly is incorporated. Although not shown, it shall be understood that the sprocket assembly 10 of the invention may be used in conjunction with a chain and a derailer assembly, wherein the derailer serves to derail the chain entrained around one sprocket to an adjacent sprocket of the sprocket assembly 10. Many types of derailers may be employed with the sprocket assembly 10 of the invention without departing from the spirit and scope of this invention.

More particularly, each of the sprockets $S_{1-6}$, comprises a non-circular configuration that includes at least one smaller dedendum radius and at least one longer dedendum radius. In the preferred embodiment, the non-circular configuration preferably comprises an eccentric oval configuration. There are two short dedendum radiuses forming a short dedendum diameter and two long dedendum radiuses forming a long dedendum diameter. The short and long dedendum radii are dimensioned such that a short dedendum radius of one sprocket is substantially equal in length or slightly appreciably shorter in length to a long dedendum radius of an adjacent sprocket. Further, in accordance with the principles of this invention, the individual sprockets $S_{1-6}$ are axially aligned on the axis X of the wheel to which the sprocket assembly 10 is mounted, in a position such that the long dedendum radius of one sprocket is axially aligned or retarded relative to the short dedendum radius of an adjacent sprocket.

In the preferred embodiment of the sprocket assembly 10 of the invention as comprising six sprockets each of an eccentric oval configuration, the aforementioned relationship results in adjacent sprockets having dedendum diameters that are substantially equal in length in at least five positions. For example, as shown in FIG. 2, the short dedendum diameters $S_{2_S}$ and $S_{4_S}$ of sprockets $S_2$ and $S_4$ are substantially equal or slightly appreciably greater in length to the long dedendum diameters $S_{3_L}$ and $S_{5_L}$ of respective adjacent sprockets, $S_3$ and $S_5$, respectively. Similarly, as shown in FIG. 3, the short dedendum diameters $S_{1_S}$, $S_{3_S}$ and $S_{5_S}$ of sprockets $S_1$, $S_3$ and $S_5$ are substantially equal or slightly appreciably greater in length to the long dedendum diameters $S_{2_L}$, $S_{4_L}$ and $S_{6_L}$ of sprockets $S_2$, $S_4$ and $S_6$, respectively. These relationships are reflected in the table as follows:

| DEDENDUM DIAMETERS |
| --- |
| $S_{1_S} > = S_{2_L}$ |
| $S_{2_S} > = S_{3_L}$ |
| $S_{3_S} > = S_{4_L}$ |
| $S_{4_S} > = S_{5_L}$ |
| $S_{5_S} > = S_{6_L}$ |

That the long dedendum radius of the sprockets may be retarded relative to the short dedendum radius of adjacent sprockets, preferably by about one tooth, assures that the distance between respective disengaging and engaging teeth of the adjacent sprockets is equal to the pitch of the chain thereby facilitating smoother chain derailing. Furthermore, it is noted that several of the teeth along the area of the adjacent equal-in-length dedendum diameters of the sprockets may be specially configured to be easily disengagable and engagable by the chain during derailing. For conventional 20, 22, 24, 26 and 28 tooth gears, this group may comprise five teeth having a chamfer face 12. For conventional 18 and 16 tooth gears, this group may comprise three teeth having a chamfer face 12. Each group may include at least one tooth that is slanted 14 toward the adjacent sprocket to which derailing is to occur.

During operation, starting with a chain that is entrained around the first sprocket $S_1$, the derailer assembly forcibly moves the chain sideways to be in alignment with the second sprocket $S_2$. The second sprocket $S_2$ engages the chain at the point as shown in FIG. 1 wherein the short dedendum diameter $S_{1_S}$ of the first sprocket $S_1$ is substantially equal in length to the dedendum diameter $S_{2_L}$ of the second sprocket $S_2$.

Likewise, derailing from the second to the third sprockets $S_2$–$S_3$, occurs at a point when the short dedendum radius $S_{2_S}$ is aligned with the long dedendum diameter $S_{3_L}$ at sprocket $S_3$. The respective alignments continue for the balance of the sprockets S for shifting into higher gears and in a reverse direction for shifting into lower gears.

It should be appreciated that the cluster sprocket assembly of the invention facilitates the derailing of the chain from one sprocket to another without slippage and is therefore particularly useful when incorporated into a multi-speed bicycle transmission. However, it should be understood that the sprocket assembly 10 of the invention may be incorporated into transmissions for other machinery and prime movers without departing from the spirit and scope of this invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A cluster sprocket assembly, comprising in combination:

at least two sprockets axially and concentrically positioned relative to one another;

said sprockets comprising a non-circular configuration having at least one long dedendum radius and at least one short dedendum radius; and said sprockets being axially aligned adjacent to one another such that said short dedendum radius of one said sprocket is axially substantially aligned with and substantially equal in length with said long dedendum radius of an adjacent sprocket.

2. The cluster sprocket assembly as set forth in claim 1, further including two of said long dedendum radiuses forming a long dedendum diameter and two said short dedendum diameters forming a short dedendum diameter.

3. The cluster sprocket assembly as set forth in claim 2, wherein said short dedendum diameter of an adjacent said sprocket is axially substantially aligned with and substantially equal in length with said long dedendum diameter of another adjacent said sprocket.

4. The cluster sprocket assembly as set forth in claim 1, wherein said long dedendum radius of one said sprocket is slightly appreciably shorter in length than said short dedendum radius of an adjacent said sprocket.

5. The cluster sprocket assembly as set forth in claim 1, wherein an apex of at least some teeth of said sprockets include a chamfer face.

6. The cluster sprocket assembly as set forth in claim 5, wherein said apex of at least one of said sprockets further includes a slanted apex.

7. The cluster sprocket assembly as set forth in claim 1, wherein said axial positioning of one said sprockets is retarded relative to said axial positioning of an adjacent larger said sprocket.

8. A transmission for a prime mover including a cluster sprocket assembly as set forth in claim 1.

9. A bicycle transmission including a cluster sprocket assembly as set forth in claim 1.

10. A cluster sprocket assembly for a primer mover, comprising a plurality of progressively-sized sprockets axially and concentrically positioned relative to one another, said axial positioning of one said sprockets being retarded relative to said axial positioning of an adjacent larger said sprocket, said sprockets comprising a non-circular configuration having at least one long dedendum diameter and at least one short dedendum diameter, said short dedendum diameter of said sprockets being slightly appreciably longer in length than said long dedendum radius of respective adjacent sprockets, an apex of at least some teeth of said sprockets including a chamfer face, said apex of at least one of said sprockets further including a slanted apex.

11. A transmission for a prime mover including a cluster sprocket assembly as set forth in claim 10.

12. A bicycle transmission including a cluster sprocket assembly as set forth in claim 10.

* * * * *